July 18, 1950  W. E. PAKALA  2,516,016
ARC WELDING APPARATUS
Filed Nov. 3, 1948
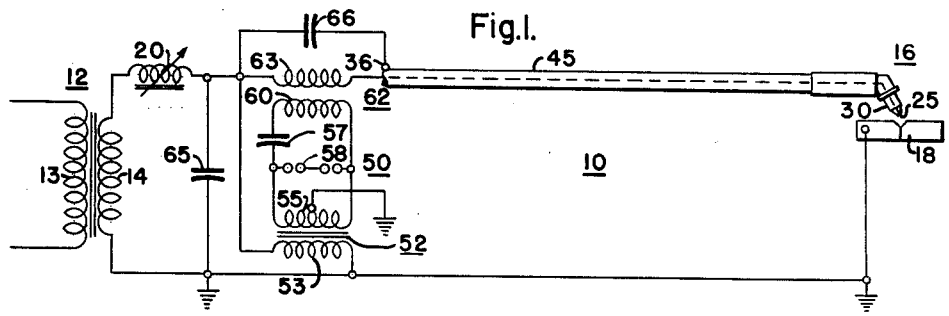
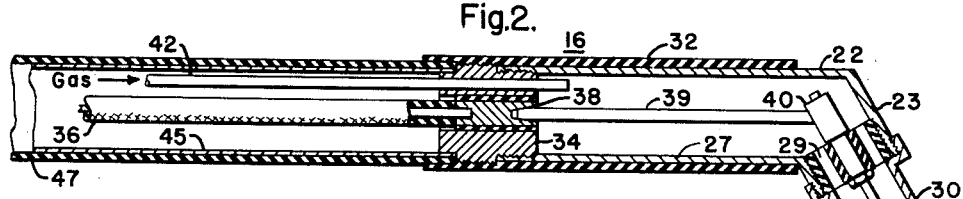
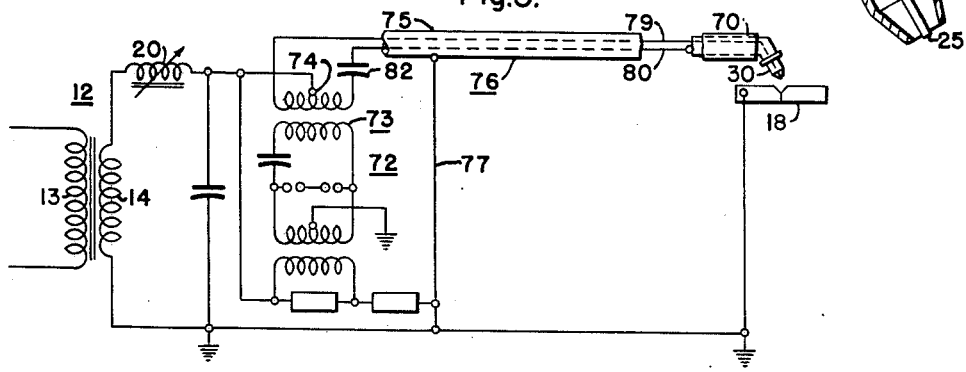
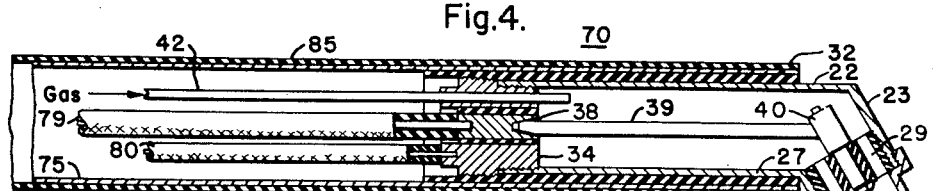
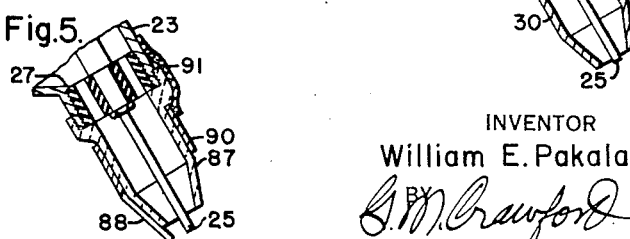
WITNESSES:
H. F. Susser.
F. V. Giolma
INVENTOR
William E. Pakala.
BY G. M. Crawford
ATTORNEY Patented July 18, 1950

2,516,016

UNITED STATES PATENT OFFICE 2,516,016

ARC WELDING APPARATUS

William E. Pakala, Pittsburgh, Pa., assignor to Westinghouse Electric Corporation, East Pittsburgh, Pa., a corporation of Pennsylvania Application November 3, 1948, Serial No. 58,136

16 Claims. (Cl. 315—246)

My invention relates, generally, to arc welding apparatus, and it has reference in particular to arc initiating and stabilizing systems and welding torch constructions for use in alternating current or direct current arc welding systems.

Generally stated, it is an object of my invention to provide a stabilized arc welding system which is simple and inexpensive to manufacture, and is reliable and effective in operation.

More specifically, it is an object of my invention to provide, in an arc welding system, for utilizing an auxiliary high-frequency arc for initiating and stabilizing a welding arc between the welding electrode and work upon which a welding operation is to be performed.

Another object of my invention is to provide, in high-frequency arc initiating and stabilizing systems, for shielding the high-frequency connections between a high-frequency generator and the welding arc so as to minimize radiation and reduce radio interference.

It is an important object of my invention to provide, in arc welding systems, for utilizing a balanced circuit arrangement for supplying high-frequency current to an auxiliary arc in conjunction with a welding electrode, so as to minimize high-frequency radiation.

Another important object of my invention is to provide, in an alternating current arc welding system, for mounting an auxiliary electrode in arcing relation with the main welding electrode to assist in initiating and/or stabilizing a main or welding arc.

Yet another object of my invention is to provide, in an alternating current or a direct current arc welding system, for utilizing an auxiliary electrode in arcing relation with the welding electrode, and for conducting a high-frequency current to the auxiliary electrode through a shielded conductor which includes a return circuit for the high-frequency current.

Another important object of my invention is to provide, in a high-frequency arc stabilizing system, for preventing the return of high-frequency current through the ground or the grounded side of the welding circuit.

I further propose to provide, in a gaseous atmosphere arc welding system, for utilizing a metallic nozzle on a welding torch as an auxiliary electrode for maintaining a high-frequency arc with the welding electrode.

Other objects will in part be obvious, and will in part be explained hereinafter.

In practicing my invention in one of its forms, a metal nozzle surrounding the tungsten welding electrode in an inert gaseous atmosphere electrode holder or welding torch is utilized to provide an auxiliary electrode in arcing relation with the welding electrode. A high-frequency generator is connected to the welding lead to apply a high-frequency voltage between the welding electrode and the auxiliary electrode. A flexible braided metal or solid metal shield positioned about the welding lead is connected to the metal nozzle, or to a metal cylinder wrapped around the gas cup, to provide a return circuit for the high-frequency current.

For a more complete understanding of the nature and scope of my invention, reference may be made to the following detailed description, which may be read in connection with the accompanying drawing in which:

Figure 1 is a diagrammatic view of an arc welding system embodying the invention in one of its forms.

Fig. 2 is an enlarged sectional view in elevation of the electrode holder or welding torch shown in Fig. 1.

Fig. 3 is a diagrammatic view of an arc welding system embodying the invention in another of its forms.

Fig. 4 is an enlarged longitudinal sectional view of the electrode holder or welding torch shown generally in Fig. 3, and Fig. 5 is a partial enlarged sectional view, in side elevation, of an electrode holder or welding torch embodying the invention in another of its forms.

Referring to Fig. 1, the reference numeral 10 may denote, generally, an arc welding system wherein a welding transformer 12 having a primary winding 13 and a secondary winding 14 may be disposed to supply welding current to an arc welding circuit including an electrode holder or welding torch 16 and work 18 upon which a welding operation is to be performed. A current limiting reactor 20 may be connected in series circuit relation with the secondary winding 14 and the welding torch 16 for controlling the value of the welding current.

Referring to Fig. 2, it may be seen that the electrode holder or welding torch 12 may comprise, for example, a tubular body member 22 having an angularly related head portion 23, wherein a main or welding electrode 25, which may comprise a tungsten rod, may be supported by means of an insulating bushing 27 having a plurality of openings 29 therein to provide for passage of a gas, such as argon, to provide an inert shielding gaseous atmosphere in the arc region at the end of the welding electrode 25. A tubular nozzle 30 may be attached to the portion 23 for substantially enclosing the electrode 25 and directing the gas in close proximity thereto. In accordance with the teachings of my invention, the nozzle 30 may be comprised of a suitable conductive material such as copper, stainless steel, or the like, so that it may function as an auxiliary electrode, as will be explained more in detail hereinafter. A handle 32 of insulating material may be positioned about the body portion 22, being for example, threadably secured to a bushing 34 positioned in the end of the body portion remote from the head portion 23.

Electrical connections may be made to the welding electrode 25 by means of a cable 36 which may be fastened in any suitable manner to a connector 38 insulatedly supported in the bushing 34. Connecting means such as the rod 39 and bushing 40 may be disposed to provide an electrical connection between the connector 38 and the welding electrode 25. The gas may be supplied to the nozzle 30 through a flexible conduit 42 which passes through the bushing 34.

With a view to reducing the amount of high-frequency radiation, the cable 36 may comprise a concentric cable, having, for example, a conductive shield 45 positioned about the conductor of the welding cable 36 thus providing a concentric conductor arrangement. This shield may, for example, comprise either a flexible metal hose or a braided metallic sleeve of a type well known in the art. The sleeve may be attached to the bushing 34 in any suitable manner being, for example, welded, soldered or brazed thereto. A layer of insulating material 47 may be disposed about the sleeve 45 comprising, for example, a layer of rubber tape or molded synthetic insulation.

Referring again to Fig. 1, it will be seen that a high-frequency generator 50 may be utilized to impress a high-frequency voltage between the welding electrode 25 and the nozzle 30 of the welding torch, which functions as an auxiliary electrode. The generator 50 may be of any suitable type comprising, for example, a step-up transformer 52 having a primary winding 53 and a secondary winding 55. The primary winding 53 may be connected either across the secondary winding 14 of the welding transformer or on the arc side of the current limiting reactor 20, as shown. The secondary winding 55 may be connected to an oscillatory circuit including a capacitor 57, spark gaps 58 and the primary winding 60, of a coupling transformer 62 having a secondary winding 63 connected in series circuit relations with the current limiting reactor 20 and the welding lead 36.

In order to minimize high-frequency radiations and thereby reduce radio interference, I provide a return circuit for the high-frequency current produced by generator 50, by connecting the braided shield 45 to the welding transformer side of the secondary winding 63 of the coupling transformer 62, through a capacitor 66 having low impedance to R. F. and sufficiently high impedance to 60 cycles to limit the 60 cycle current in the auxiliary arc. This capacitor may also be connected at the torch in series circuit relation with the outer shield. If this is done, the shield can then be connected directly to the apparatus metal case and to ground.

Since this side of the secondary winding 63 is connected to ground by a by-pass condenser 65, the braided shield 45 provides a relatively low impedance return circuit from the auxiliary electrode or nozzle 30 and at the same time connects the electrode lead shield to ground relative to the high-frequency current. Both sides of the high-frequency circuit are thus kept in close proximity to each other, thus minimizing radiation.

Referring to Fig. 3, it will be seen that in a modification of the invention, an electrode holder or welding torch 70, similar to the holder or torch 16 of Fig. 1 may be supplied with welding current from a transformer 12, and a high-frequency voltage may be supplied to the welding torch from a high-frequency generator 72 for maintaining an auxiliary arc between the welding electrode 25 and an auxiliary electrode 30 in a similar manner to that shown and described in connection with Figs. 1 and 2.

In order to provide a balanced high-frequency system, the coupling transformer 73 of the high-frequency generator 50 may be provided with a center tap 74 to which connection may be made from the secondary winding 14 of the transformer 12. Instead of utilizing the shield 75 of the shielded conductor 76 for conducting the high-frequency current between the main and auxiliary electrodes, the shield 75 may be connected to ground by means of conductor 77, and the two conductors 79 and 80 of the shielded conductor 76, may be connected to the welding electrode and to the auxiliary electrode, respectively, for providing a complete path for the high-frequency current. The high-frequency potential between each of the conductors 79 and 80 and ground will then be balanced, minimizing radiation. A capacitor 82 may be connected in circuit relation with the conductor 80 to block the 60 cycle welding current.

Referring to Fig. 4, it will be seen that the torch 70 of Fig. 3 may comprise a tubular body member 22 having an angularly related head portion 23 wherein a tungsten welding electrode 25 may be mounted by means of an insulating bushing 27 in a manner similar to that described in connection with Fig. 2. Electrical connections may be made to the welding electrode 25 by means of a conductor 39 and a connector 38 insulatedly mounted in the bushing 34 secured to the end of the body member 22 remote from the head portion. A flexible conduit 42 may be utilized to supply gas to the nozzle 30 mounted on the head portion about the welding electrode 25.

Instead of utilizing the braided shield of the shielded conductor 76 for providing the return circuit for the high-frequency current as in Figs. 1 and 2, the conductor 80 may be utilized, being, for example, connected to the bushing 34 which may be electrically connected to the nozzle 30 through the body and head portions of the welding torch. The welding lead or conductor 79 may be secured to the connector 38 in the same manner as shown in Fig. 2 for conductor 36.

With a view to minimizing high-frequency radiations, the shield 75 may extend about a principal part of the body portion 22 being, for example, positioned about the outer surface of the insulated sleeve 32 which served as a handle for the torch shown in Fig. 2. A layer of insulating material 85 may be positioned about the sleeve 75 to protect it against abrasion.

Referring to Fig. 5, the reference numeral 23 may denote the angularly related head portion of an electrode holder or welding torch generally similar to those shown in Figs. 2 and 4, wherein a tungsten welding electrode 25 may be mounted by means of an insulating bushing 27. Instead, however, of utilizing a metallic nozzle such as the nozzle 30 for directing the flow of gas about the welding electrode, a nozzle 87 of an insulating material may be utilized comprising, for example, a refractory material suitably secured to the head portion 23, such as by means of threaded engagement therewith.

In order to provide an auxiliary arc with the welding electrode 25 for facilitating the striking and stabilizing a welding arc, an auxiliary electrode 88 may be utilized. The auxiliary electrode 88 may comprise, for example, a length of tungsten wire which may be secured to the nozzle 87 by means of a metallic sheath, band or clamp 90. By connecting the band 90 to the head portion 23 by means of a shunt 91, the high-frequency voltage impressed between the welding and auxiliary electrodes may be utilized to produce corona about the welding electrode in the region encompassed by the band 90. This produces ions in the stream of gas passing through the nozzle 87 and facilitates starting of the high-frequency arc between the main and auxiliary electrodes.

From the above description and the accompanying drawing, it will be seen that I have provided in a simple and effective manner for initiating and stabilizing the arc in alternating current arc welding systems. While my invention is particularly adapted to alternating current arc welding systems utilizing inert gaseous atmosphere, it is not limited to use with such systems and is as readily applicable to other types of welding systems, including direct current systems and systems utilizing consumable as well as non-consumable electrodes. By utilizing arc welding systems embodying the features of my invention, the high-frequency current utilized to initiate and/or stabilize the main or welding arc is returned to the high-frequency generator through a substantially non-radiating transmission system. The use of an auxiliary electrode in arcing relation with the welding electrode permits an auxiliary arc to be initiated and maintained before the welding arc is struck, and while the welding torch is remote from the work. The auxiliary arc gap is placed in the stream of argon or helium gas and the auxiliary electrode may be placed a distance about twice as far from the welding electrode as the welding electrode is spaced from the work during welding. During non-welding conditions, the high-frequency arc exists between the welding electrode and the auxiliary electrode. When the welding torch is brought into close proximity with the work, the single arc changes to a twin arc, one between each electrode and the work.

The arc or discharge existing between the main electrode and auxiliary electrode or electrodes is directly in the path of the inert gas or any gas which is used for welding. The moving gas will transfer ions from the auxiliary arc toward the welding gap and the work surface where they are needed and where they are helpful in initiating an arc cathode and welding current flow. This ion transfer is especially helpful in initiating the arc cathode on metals, such as aluminum, which has a high arc re-ignition voltage and low electron emission at the temperature required for welding the metal.

By utilizing the shield of a concentric cable as the return path for the high-frequency current, the welding system may be made substantially non-radiating, both when welding or otherwise. By utilizing a balanced, high-frequency transmission system, the radiation is still further reduced. Such a system is balanced with respect to ground and substantially no high-frequency current returns through the ground circuit.

Since certain changes may be made in the above-described construction, and different embodiments of the invention may be made without departing from the spirit or scope thereof, it is intended that all the matter contained in the above-described and shown in the accompanying drawing shall be considered as illustrative, and not in a limiting sense.

I claim as my invention:

1. In combination with an arc welding system including circuit means disposed to supply welding current to a welding electrode and work upon which a welding operation is to be performed, an auxiliary electrode disposed in arcing relation with the main electrode, and a high-frequency generator connected to apply a high-frequency voltage between the auxiliary and welding electrodes.

2. An arc initiating and/or stabilizing system for use with an arc welding circuit including a welding electrode and work upon which a welding operation is to be performed comprising, an auxiliary electrode positioned in arcing relation with the welding electrode, a high-frequency generator, and circuit means including a shielded conductor connected to supply welding current to the welding electrode and disposed to connect the high-frequency generator to the auxiliary electrode.

3. An arc welding system comprising, a welding electrode, a high-frequency generator, an auxiliary electrode disposed in arcing relation with the welding electrode, and circuit means including a shielded cable connecting the welding electrode to a source of welding current, said cable being also disposed to connect the high-frequency generator in circuit relation with the welding and auxiliary electrodes.

4. The combination with a welding torch having a main welding electrode, of an auxiliary electrode connected in arcing relation with the main electrode, a high-frequency generator, a shielded conductor disposed to connect the welding electrode to a source of welding current, coupling means connecting the high-frequency generator in circuit relation with the welding electrode and source, and circuit means connecting the shield on the cable to provide a return circuit for a high-frequency arc current between the main and auxiliary electrodes.

5. An arc welding system comprising, a welding transformer, a high-frequency generator, a welding torch having main and auxiliary electrodes disposed in arcing relation, a shielded conductor connecting the main electrode to the welding transformer, coupling means connecting the high-frequency generator to the welding electrode through a conductor of the shielded conductor, and additional circuit means providing a high-frequency return circuit through the shield of the shielded conductor.

6. The combination with a welding transformer, of an electrode holder having a main welding electrode and an auxiliary electrode, a shielded conductor having a conductor connected to the main electrode and a metallic shield connected to the auxiliary electrode, a high-frequency generator including coupling means connecting the conductor of the shielded conductor to one terminal of the welding transformer, and circuit means including a capacitor connecting the shield to provide a return circuit for a high-frequency current.

7. For use with a welding system having a transformer disposed to supply alternating welding current to an arc welding circuit, a welding torch having a central welding electrode surrounded by a hollow nozzle disposed to supply a gas to an arc zone adjacent the end of the welding electrode, said nozzle being conductive and disposed in insulated relation with the welding electrode, a shielded conductor having a conductor connected to the welding electrode and a conductive shield connected with the nozzle, a high-frequency generator including coupling means connecting the conductor to one terminal of the transformer, and circuit means including a capacitor connecting the shield to provide a return circuit for a high-frequency current.

8. A welding torch comprising, a handle, a main welding electrode supported by the handle, an auxiliary electrode disposed in arcing relation with the main electrode, and a shielded conductor having a conductor connected to the main electrode and a conductive shield surrounding the conductor, said shield being connected to the auxiliary electrode.

9. In combination in a welding torch, a central welding electrode, an auxiliary electrode disposed in arcing relation adjacent the end of the welding electrode, and a shielded conductor having an outer conductive shield connected to the auxiliary electrode and an inner conductor connected to the welding electrode.

10. In welding apparatus, a tubular body member of a conductive material, a main welding electrode mounted in the body member in insulated relation therewith and projecting therefrom adjacent one end, a hollow metal nozzle secured to the body member and substantially surrounding the projecting end of the welding electrode, a shielded cable having a conductor connected to the welding electrode and a conductive shield surrounding the conductor connected to the hollow metal nozzle.

11. A welding torch comprising, a handle having an electrode member projecting therefrom, a gas conducting nozzle of insulating material supported on the handle about the projecting end of the welding electrode, a member of a conducting material positioned about the nozzle, and circuit means connecting said members to a source of voltage disposed to produce a sufficiently strong potential field between said members to provide pre-ionization of the gas adjacent the welding electrode.

12. In a welding torch, a handle having a welding electrode projecting therefrom and disposed to supply a stream of gas about the welding electrode, a refractory nozzle positioned about the projecting welding electrode to provide a passage for the gas, an auxiliary electrode positioned in arcing relation with the welding electrode, and a conductive band mounted on the nozzle disposed to be maintained at a sufficient potential difference from the welding electrode for providing a corona discharge between the welding electrode and the band in the stream of gas.

13. The combination with a welding transformer, of an electrode holder having main and auxiliary electrodes, a shielded cable having a pair of conductors individually connected to the electrodes and a conductive shield, a high-frequency generator including coupling means connecting the generator to the pair of conductors, and circuit means grounding the conductive sheath.

14. An arc welding system comprising, a welding torch having main and auxiliary electrodes disposed in arcing relation, a shielded cable having a pair of conductors one connected to each electrode and a conductive shield, a high-frequency generator having a center-tapped coupling coil, a capacitor connecting one terminal of the coupling coil to the conductor connected to the auxiliary electrode, the other terminal of the coupling coil being connected to the other conductor, and circuit means connecting the center tap to a source of welding current.

15. An arc welding system comprising, a welding transformer having one terminal disposed to be connected to work upon which a welding operation is disposed to be performed, a welding torch having a main electrode disposed to maintain an arc with the work and an auxiliary electrode disposed in arcing relation with the main electrode, a shielded cable having conductors connected to the main and auxiliary electrodes and provided with a grounded conductive sheath, a high-frequency generator energized from the welding transformer and provided with a coupling coil having end terminals and a center tap connected to the other terminal of the welding transformer, and a capacitor connecting one end terminal to the conductor connected to the auxiliary electrode, the other end terminal being connected to the other conductor.

16. In a stabilized arc welding system, an electrode holder having main and auxiliary electrodes, a shielded cable having a pair of conductors connected one to each electrode and a conductive shield connected to ground, a high-frequency generator having a center-tapped coupling coil connected at one end to the conductor connected to the main electrode, a capacitor connecting the other conductor to the other end of the coupling coil, an additional capacitor connecting the center tap to ground, and a welding transformer connected between the center tap and ground.

WILLIAM E. PAKALA.

REFERENCES CITED

The following references are of record in the file of this patent:

UNITED STATES PATENTS

| Number | Name | Date |
| --- | --- | --- |
| 1,707,433 | Hand | Apr. 2, 1929 |
| 1,911,033 | Nagashev | May 23, 1933 |
| 2,340,093 | White | Jan. 25, 1944 |
| 2,475,183 | Gibson | July 5, 1949 |

FOREIGN PATENTS

| Number | Country | Date |
| --- | --- | --- |
| 325,132 | Great Britain | Feb. 13, 1930 |